United States Patent
Kono (10) Patent No.: US 10,352,603 B2
(45) Date of Patent: Jul. 16, 2019

(54) CONTROL APPARATUS FOR COOLING SYSTEM

(71) Applicant: FUJI ELECTRIC CO., LTD., Kawasaki (JP)

(72) Inventor: Hiroyuki Kono, Suzuka (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 622 days.

(21) Appl. No.: 14/847,718

(22) Filed: Sep. 8, 2015

(65) Prior Publication Data

US 2015/0377535 A1 Dec. 31, 2015

Related U.S. Application Data

(63) Continuation of application No. PCT/JP2014/055023, filed on Feb. 28, 2014.

(30) Foreign Application Priority Data

Apr. 8, 2013 (JP) .................................. 2013-080232

(51) Int. Cl.
F25B 7/00 (2006.01)
F25B 49/02 (2006.01)
(Continued)

(52) U.S. Cl.
CPC ............ *F25B 49/02* (2013.01); *F28F 27/003* (2013.01); *F25B 25/005* (2013.01); (Continued)

(58) Field of Classification Search
CPC ......... F25B 49/00; F25B 7/00; F25B 15/006; F24F 11/30
See application file for complete search history.

(56) References Cited

U.S. PATENT DOCUMENTS 4,252,751 A * 2/1981 Shito .................... F04D 27/004
261/109
4,472,947 A * 9/1984 Saito ...................... F25B 15/06
62/141

(Continued)

FOREIGN PATENT DOCUMENTS

JP 5-164383 6/1993
JP 5-223493 8/1993
(Continued)

OTHER PUBLICATIONS

International Search Report dated May 27, 2014, in corresponding International Application No. PCT/JP2014/055023.

*Primary Examiner* — Ljiljana V. Ciric
*Assistant Examiner* — Alexis K Cox (57) ABSTRACT

A cooling system includes a cooling tower, a refrigeration device, a cooling fan provided in the cooling tower, a cooling water pump which circulates cooling water between the cooling tower and the refrigeration device, an inlet temperature sensor which detects the cooling water temperature at an inlet of the cooling tower, an outlet temperature sensor which detects the cooling water temperature at an outlet of the cooling tower, and an inverter apparatus which variably controls the speed of the cooling fan or the cooling water pump. The output frequency of the inverter apparatus is reduced after the output frequency reaches an upper limit frequency. The inverter apparatus controls the cooling device based on a temperature differential between a temperature of the cooling water at the inlet and a temperature of the cooling water at the outlet.

7 Claims, 9 Drawing Sheets

(51) Int. Cl.
*F28F 27/00* (2006.01)
*F28C 1/00* (2006.01)
*F25B 25/00* (2006.01)

(52) U.S. Cl.
CPC ..... *F25B 2339/047* (2013.01); *F25B 2600/13* (2013.01); *F25B 2700/21161* (2013.01); *F25B 2700/21171* (2013.01); *F28C 2001/006* (2013.01); *Y02B 30/745* (2013.01); *Y02B 30/748* (2013.01)

(56) References Cited

U.S. PATENT DOCUMENTS

| | | | | |
|---|---|---|---|---|
| 4,507,930 | A | * | 4/1985 | Kaya ........................ G01K 17/10 165/11.1 |
| 5,275,010 | A | * | 1/1994 | Hisajima ................ F25B 15/008 62/148 |
| 6,446,448 | B1 | * | 9/2002 | Wang ..................... F24F 5/0035 62/183 |
| 6,446,941 | B1 | | 9/2002 | Maheshwari et al. |
| 8,444,118 | B1 | * | 5/2013 | Dumler ..................... F28C 1/00 261/26 |
| 9,957,970 | B2 | * | 5/2018 | Tateishi .................. F04D 27/004 |
| 2004/0011066 | A1 | * | 1/2004 | Sugihara ................... F24F 11/30 62/177 |
| 2014/0244051 | A1 | * | 8/2014 | Rollins ............... B01F 3/04078 700/282 |
| 2016/0161928 | A1 | * | 6/2016 | Bobker .................. G05B 15/02 700/275 |

FOREIGN PATENT DOCUMENTS

| | | |
|---|---|---|
| JP | 2000-283527 | 10/2000 |
| JP | 2009-198123 | 9/2009 |
| JP | 2009-216375 | 9/2009 |
| JP | 2010-48439 | 3/2010 |
| JP | 2010-60166 | 3/2010 |
| JP | 2010-60204 | 3/2010 |
| JP | 2011-226684 | 11/2011 |
| WO | WO 2013/005842 A1 | 1/2013 |

* cited by examiner

CONTROL APPARATUS FOR COOLING SYSTEM

CROSS-REFERENCE TO RELATED APPLICATIONS

This application is a continuation application, filed under 35 U.S.C. § 111(a), of International Application PCT/JP2014/055023, filed on Feb. 28, 2014, and claims benefit of foreign priority to Japanese Patent Application 2013-080232, filed Apr. 8, 2013, the disclosure of each of which is incorporated herein by reference.

BACKGROUND

1. Field

The present disclosure relates to a control apparatus for a cooling system which is used in air-conditioning equipment, or the like, and which circulates cooling water between a cooling tower and a refrigeration device.

2. Related Art

In general, a cooling system which is used in air-conditioning equipment, and the like, is provided with a cooling tower, a refrigeration device, and an air conditioner which is the cooling load, and cooling water that has been cooled in the cooling tower is sent to the refrigeration device by a cooling water pump, and in the refrigeration device, heat exchange is performed with cold water which cools the air conditioner. Japanese Patent Application Publication No. 2000-283527, for example, describes a control apparatus for a cooling system of this kind.

In this cooling system, the cold water produced by the refrigeration device is supplied to the air conditioner by a cold water pump and is returned to the refrigeration device after receiving heat exchange processing in the air conditioner. On the other hand, in the cooling tower, a cooling fan for cooling the cooling water by blowing air is provided, and the cooling water cooled in the cooling tower is sent to the refrigeration device by the cooling water pump, and is returned to the cooling tower after performing heat exchange in the refrigeration device. Either both or one of an inlet temperature sensor, which detects the cooling water temperature at an inlet of the cooling tower, and an outlet temperature sensor, which detects the cooling tower temperature at an outlet of the cooling tower, are provided in pipes of the cooling water.

The possible control methods for a cooling system of this kind include: "control of the cooling fan", "control of the cooling water pump" and "control of both the cooling fan and the cooling water pump", and the like, and in these methods the number of revolutions of the cooling fan and/or the cooling water pump is controlled, thereby adjusting the flow volume of cooling air and the flow volume of cooling water, by adjusting the output frequency of an inverter apparatus on the basis of the detection values for the inlet temperature and the outlet temperature of the cooling water.

Below, "control of the cooling fan" is described, but the same applies to "control of the cooling water pump" and "control of both the cooling fan and the cooling water pump", and in each of these cases, control is implemented on the basis of uniform inlet temperature control for controlling the cooling water temperature at the cooling tower inlet to a uniform temperature, or uniform outlet temperature control for controlling the cooling water temperature at the cooling tower outlet to a uniform temperature, or uniform temperature differential control for controlling the temperature differential between the inlet temperature and the outlet temperature of the cooling water at the cooling tower to a uniform differential.

Uniform inlet temperature control by control of the cooling fan involves detecting the cooling water inlet temperature at the inlet of the cooling tower, and controlling the number of revolutions of the fan motor which drives the cooling fan, by the inverter apparatus, in such a manner that the detected value of the cooling water inlet temperature matches a previously established inlet temperature set value.

With this uniform inlet temperature control, when the cooling water inlet temperature is low, it is not necessary to cool the cooling water greatly in the cooling tower, and therefore the output frequency of the inverter apparatus is lowered to reduce the number of revolutions of the fan motor, whereas when the cooling water inlet temperature is high, it is necessary to cool the cooling water in the cooling tower, and therefore the output frequency of the inverter apparatus is raised to increase the number of revolutions of the fan motor.

Furthermore, uniform outlet temperature control by control of the cooling fan involves detecting the cooling water outlet temperature at the outlet of the cooling tower, and controlling the number of revolutions of the fan motor which drives the cooling fan, by the inverter apparatus, in such a manner that the detection value of the cooling water outlet temperature matches a previously established outlet temperature set value.

With this uniform outlet temperature control, when the cooling water outlet temperature is low, it is not necessary to cool the cooling water greatly in the cooling tower, and therefore the output frequency of the inverter apparatus is lowered to reduce the number of revolutions of the fan motor, whereas when the cooling water outlet temperature is high, it is necessary to cool the cooling water in the cooling tower, and therefore the output frequency of the inverter apparatus is raised to increase the number of revolutions of the fan motor.

Moreover, uniform temperature differential control by control of the cooling fan involves determining the temperature differential between the cooling water inlet temperature and the cooling water outlet temperature, from the detection values for the cooling water inlet temperature at the cooling tower inlet and the cooling water outlet temperature at the cooling tower outlet, and controlling the number of revolutions of the fan motor which drives the cooling fan, by the inverter apparatus, in such a manner that the temperature differential is uniform.

With this uniform temperature differential control, when the temperature differential of the cooling water between the inlet and the outlet is small, it is not necessary to cool the cooling water greatly in the cooling tower, and therefore the output frequency of the inverter apparatus is lowered to reduce the number of revolutions of the fan motor, whereas when the temperature differential is large, conversely, it is necessary to cool the cooling water in the cooling tower, and therefore the output frequency of the inverter apparatus is raised to increase the number of revolutions of the fan motor.

SUMMARY

In the cooling system described above, the cooling tower is commonly an open cooling tower which utilizes the heat of evaporation (latent heat) of water, and in the case of each of the uniform inlet temperature control, uniform outlet temperature control and uniform temperature differential control, the cooling water is cooled by utilizing the heat of evaporation in the cooling tower.

However, there are limits on the cooling method, and in principle, it is not possible to reduce the temperature of the cooling water below the wet-bulb temperature of the outside air. When cooling the cooling water in the cooling tower, if the outside air temperature is high and the outside air humidity is low, then the cooling water temperature falls significantly, but if the outside air temperature is low and the outside air humidity is high, then virtually no fall in the cooling water temperature can be expected.

The uniform inlet temperature control, uniform outlet temperature control or uniform temperature differential control involve controlling the number of revolutions of the fan motor of the cooling fan in such a manner that the cooling water temperature or the cooling water temperature differential becomes a set temperature, regardless of the outside air humidity, and therefore the number of revolutions of the fan motor may be controlled to a higher value than necessary, even under outside air conditions where virtually no effect in reducing the cooling water temperature can be expected in the cooling tower.

For example, if the outside air temperature is low and the outside air humidity is high, then a great reduction of the temperature of the cooling water cannot be expected using the heat of evaporation of the water, and therefore the temperature of the cooling water is not reduced greatly, no matter how much the number of revolutions of the fan motor is increased. In cases such as this, with the uniform inlet temperature control, the uniform outlet temperature control or the uniform temperature differential control, the output frequency is progressively increased in such a manner that the cooling water temperature becomes a set value, but since the cooling water temperature does not fall, then the frequency output by the inverter apparatus eventually reaches an upper limit frequency (or maximum frequency, PID output upper limit), and the inverter apparatus continues to operate at this upper limit frequency.

In this way, depending on the outside air conditions, a cooling effect matching the number of revolutions of the fan motor is not necessarily achieved, and the inverter apparatus may output a higher frequency than necessary, giving rise to a problem of wasteful consumption of power.

A possible countermeasure to this problem might be to control the output frequency of the inverter apparatus by calculating the relative humidity from the relationship between the dry-bulb temperature and the web-bulb temperature of the outside air. However, in this case, a plurality of sensors, such as dry and wet-bulb temperature measurement sensors for measuring the dry-bulb temperature and wet-bulb temperature of the outside air, are required in addition to the cooling water temperature measurement sensor, and since dry and wet-bulb temperature measurement sensors are expensive, there is a problem in that the device costs increase.

Exemplary embodiments of the invention were devised in view of the problems described above, an aspect thereof being to provide a control apparatus for a cooling system which does not require expensive dry and wet-bulb temperature measurement sensors, and which can implement control equivalent to that using dry and wet-bulb temperature measurement sensors, using only a cooling water temperature measurement sensor. However, the present disclosure and the claims, which may include other possible embodiment, are not limited to providing these benefits and may achieve different and/or additional benefits.

In order to achieve the aforementioned aspect, a first embodiment of the invention is a control apparatus for a cooling system provided with a cooling tower, a refrigeration device, a cooling fan provided in the cooling tower, and a cooling water pump which circulates cooling water between the cooling tower and the refrigeration device, the control apparatus including: an inlet temperature sensor which detects a cooling water temperature at an inlet of the cooling tower; an inverter apparatus which calculates a command value such that the temperature detection value for the cooling water temperature matches a preset value, and variably controls the speed of the cooling fan (or the cooling water pump) by generating an AC voltage at an output frequency based on the command value; and a wet-bulb temperature estimation control unit which gradually reduces the output frequency of the inverter apparatus when the output frequency has reached an upper limit frequency, stores an output frequency at which the inlet temperature of the cooling water does not rise despite the reduction of the output frequency, and controls the cooling fan (or the cooling water pump) on the basis of the stored output frequency.

Furthermore, a second embodiment is a control apparatus for a cooling system provided with a cooling tower, a refrigeration device, a cooling fan provided in the cooling tower, and a cooling water pump which circulates cooling water between the cooling tower and the refrigeration device, the control apparatus including: an outlet temperature sensor which detects a cooling water temperature at an outlet of the cooling tower; an inverter apparatus which calculates a command value such that the temperature detection value for the cooling water temperature matches a preset value, and variably controls the speed of the cooling fan (or the cooling water pump) by generating an AC voltage at an output frequency based on the command value; and a wet-bulb temperature estimation control unit which gradually reduces the output frequency of the inverter apparatus when the output frequency has reached an upper limit frequency, stores an output frequency at which the outlet temperature of the cooling water does not rise despite the reduction of the output frequency, and controls the cooling fan (or the cooling water pump) on the basis of the stored output frequency.

Furthermore, a third embodiment is a control apparatus for a cooling system provided with a cooling tower, a refrigeration device, a cooling fan provided in the cooling tower, and a cooling water pump which circulates cooling water between the cooling tower and the refrigeration device, the control apparatus including: an inlet temperature sensor which detects a cooling Water temperature at an inlet of the cooling tower; an outlet temperature sensor which detects a cooling water temperature at an outlet of the cooling tower; a calculation unit which calculates a temperature differential between the inlet temperature and the outlet temperature of the cooling water; an inverter apparatus which calculates a command value in such a manner that the temperature differential matches a preset value, and variably controls the speed of the cooling fan (or the cooling water pump) by generating an AC voltage at an output frequency based on the command value; and a wet-bulb temperature estimation control unit which gradually reduces the output frequency of the inverter apparatus when the output frequency has reached an upper limit frequency, stores an output frequency at which the temperature differential does not increase despite the reduction of the output frequency, and controls the cooling fan (or the cooling water pump) on the basis of the stored output frequency.

Furthermore, a fourth embodiment is a control apparatus for a cooling system provided with a cooling tower, a refrigeration device, a cooling fan provided in the cooling tower, and a cooling water pump which circulates cooling water between the cooling tower and the refrigeration device, the control apparatus including: an inlet temperature sensor which detects a cooling water temperature at an inlet of the cooling tower; an inverter apparatus which calculates a command value such that the temperature detection value for the cooling water temperature matches a preset value, and variably controls the speed of the cooling fan (or the cooling water pump) by generating an AC voltage at an output frequency based on the command value; and a wet-bulb temperature estimation control unit which gradually reduces the output frequency of the inverter apparatus when the output frequency has reached an upper limit frequency, stores a temperature at which the inlet temperature of the cooling water does not rise despite the reduction of the output frequency, and controls the cooling fan (or the cooling water pump) on the basis of the stored temperature.

Furthermore, a fifth embodiment is a control apparatus for a cooling system provided with a cooling tower, a refrigeration device, a cooling fan provided in the cooling tower, and a cooling water pump which circulates cooling water between the cooling tower and the refrigeration device, the control apparatus including: an outlet temperature sensor which detects a cooling water temperature at an outlet of the cooling tower; an inverter apparatus which calculates a command value in such a manner that the temperature detection value for the cooling water temperature matches a preset value, and variably controls the speed of the cooling fan (or the cooling water pump) by generating an AC voltage at an output frequency based on the command value; and a wet-bulb temperature estimation control unit which gradually reduces the output frequency of the inverter apparatus when the output frequency has reached an upper limit frequency, stores a temperature at which the outlet temperature of the cooling water does not rise despite the reduction of the output frequency, and controls the cooling fan (or the cooling water pump) on the basis of the stored temperature.

Furthermore, a sixth embodiment is a control apparatus for a cooling system provided with a cooling tower, a refrigeration device, a cooling fan provided in the cooling tower, and a cooling water pump which circulates cooling water between the cooling tower and the refrigeration device, the control apparatus including: an inlet temperature sensor which detects a cooling water temperature at an inlet of the cooling tower; an outlet temperature sensor which detects a cooling water temperature at an outlet of the cooling tower; a calculation unit which calculates a temperature differential between the inlet temperature and the outlet temperature of the cooling water; an inverter apparatus which calculates a command value in such that the temperature differential matches a preset value, and variably controls the speed of the cooling fan (or cooling water pump) by generating an AC voltage at an output frequency based on the command value; and a wet-bulb temperature estimation control unit which gradually reduces the output frequency of the inverter apparatus when the output frequency has reached an upper limit frequency, stores a temperature differential at which the temperature differential does not increase despite the reduction of the output frequency, and controls the cooling fan (or the cooling water pump) on the basis of the stored temperature differential.

According to the embodiments described above, it is possible to achieve optimization control equivalent to that achieved using dry and wet-bulb temperature measurement sensors, by using only a cooling water inlet temperature sensor (or a cooling water outlet temperature sensor), and it is possible to reduce the energy consumption of the inverter apparatus even in the case of outside air conditions whereby a cooling effect matching the number of revolutions of the cooling fan or the cooling water pump cannot be obtained, for instance, when the outside air temperature is low or the outside air humidity is high.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
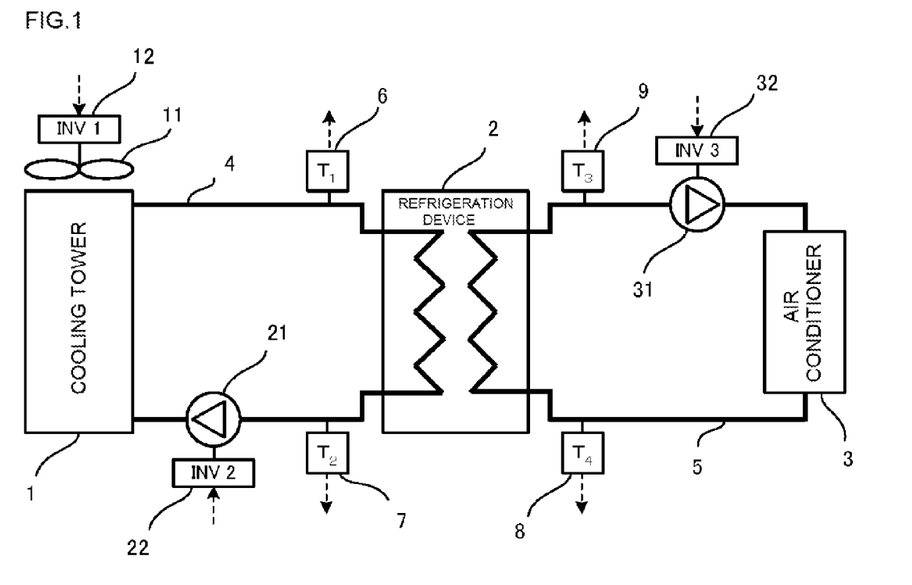
FIG. 1 is a general schematic drawing showing a cooling system in this invention.

FIG. 1 is a general schematic drawing showing a cooling system in this invention. Included in FIG. 1, is a cooling tower 1 which cools cooling water by outside air, a refrigeration device 2 which exchanges heat between cooling water that has been cooled in a cooling tower 1 and cold water which cools a cooling load, an air conditioner 3 which is a cooling load, a cooling water pipe 4 which connects the cooling tower 1 and the refrigeration device 2, a cold water pipe 5 which connects the refrigeration device 2 and the air conditioner 3, a cooling water outlet temperature sensor 6 which is provided in the cooling water pipe 4 and detects the outlet temperature $T_1$ of the cooling tower 1, a cooling water inlet temperature sensor 7 which is provided in the cooling water pipe 4 and detects the inlet temperature $T_2$ of the cooling tower 1, a cold water inlet temperature sensor 8 which is provided in the cold water pipe 5 and detects the inlet temperature $T_4$ of the refrigeration device 2, and a cold water outlet temperature sensor 9 which is provided in the cold water pipe 5 and detects the outlet temperature $T_3$ of the refrigeration device 2.

A water sprinkler pipe (not illustrated) and a cooling fan 11 for cooling by air blowing, of which the speed can be varied by an inverter apparatus 12, are provided in the cooling tower 1, whereby cooling water that has been sprinkled from the water sprinkler pipe can be cooled by contact with the outside air. A cooling water pump 21 which circulates the cooling water is provided in the cooling water pipe 4, a cold water pump 31 which circulates cold water is provided in the cold water pipe 5, and the speed of each of these pumps can be controlled respectively by inverter apparatuses 22 and 23.

The detection values of the cooling water temperatures $T_1$, $T_2$ or cold water temperatures $T_3$, $T_4$ which are detected by the temperature sensors 6, 7, 8, 9 are input to the inverter apparatuses 12, 22, 32, prescribed calculation is carried out using the temperature detection values and a preset value, and the like, and the number of revolutions of the cooling fan 11, the cooling water pump 21 and the cold water pump 31 are controlled so as to adjust the flow volume of the cooling air flow and the flow volume of the cooling water and the cold water.

Figure 2:
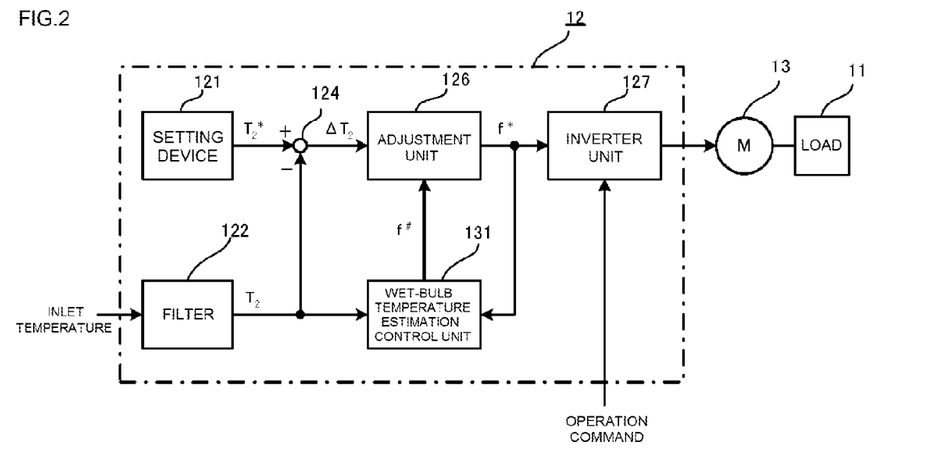
FIG. 2 is a schematic circuit diagram showing a first embodiment of the invention.

FIG. 2 is a circuit diagram showing a first embodiment of this invention, and here the inverter apparatus 12 which controls the cooling fan 11 as a load is described by way of an example. Included in the embodiment show in FIG. 2 is a setting device 121 which sets a set value $T_2^*$ for the cooling water inlet temperature at the cooling tower 1, a filter 122 which removes a noise component that is superimposed on the inlet temperature detection value $T_2$ detected by the cooling water inlet temperature sensor 7 (see FIG. 1), an addition calculation unit 124 which determines a deviation $\Delta T_2$ between the set value $T_2^*$ and the detection value $T_2$ of the inlet temperature, an adjustment unit 126 which is constituted by a PI adjuster or a PID adjuster and which makes an adjustment calculation so that the deviation $\Delta T_2$ becomes zero and outputs this calculation value as a frequency command value f*, and an inverter unit 127 which generates a frequency based on the frequency command value f* and an AC voltage having an amplitude corresponding to this frequency, and supplies same to a motor 13.

Also included in FIG. 2 is a wet-bulb temperature estimation control unit 131 which controls an output frequency of the inverter apparatus 12 on the basis of the inlet temperature detection value $T_2$ and the frequency command value f* of the cooling water in the cooling tower 1. The wet-bulb temperature estimation control unit 131 operates when the frequency command value f* reaches an upper limit frequency (or maximum frequency, the PID output upper limit in the adjustment unit 126), and discovers and stores an output frequency $f^\#$ ($\cong$frequency that corresponds to the wet-bulb temperature) at which, when the frequency command value f* has reached the upper limit frequency and is gradually reduced at a preset frequency reduction rate, the inlet temperature detection value $T_2$ of the cooling water does not rise despite the reduction of the frequency command value f*. Thereafter, the inverter apparatus 12 is operated by setting this stored output frequency $f^\#$ as a new frequency command value f*, but if the inlet temperature detection value $T_2$ reaches the inlet temperature set value $T_2^*$ which is the original target value, or if the inlet temperature detection value $T_2$ increases by a temperature rise of $\Delta T_0$, or more, with respect to the inlet temperature set value $T_2^*$, then the system reverts to normal uniform inlet temperature control based on the inlet temperature set value $T_2^*$. The frequency reduction rate can be varied by a setting from a parameter setting unit (not illustrated) which sets and changes parameters of various types for the inverter apparatus 12.

Figure 3:
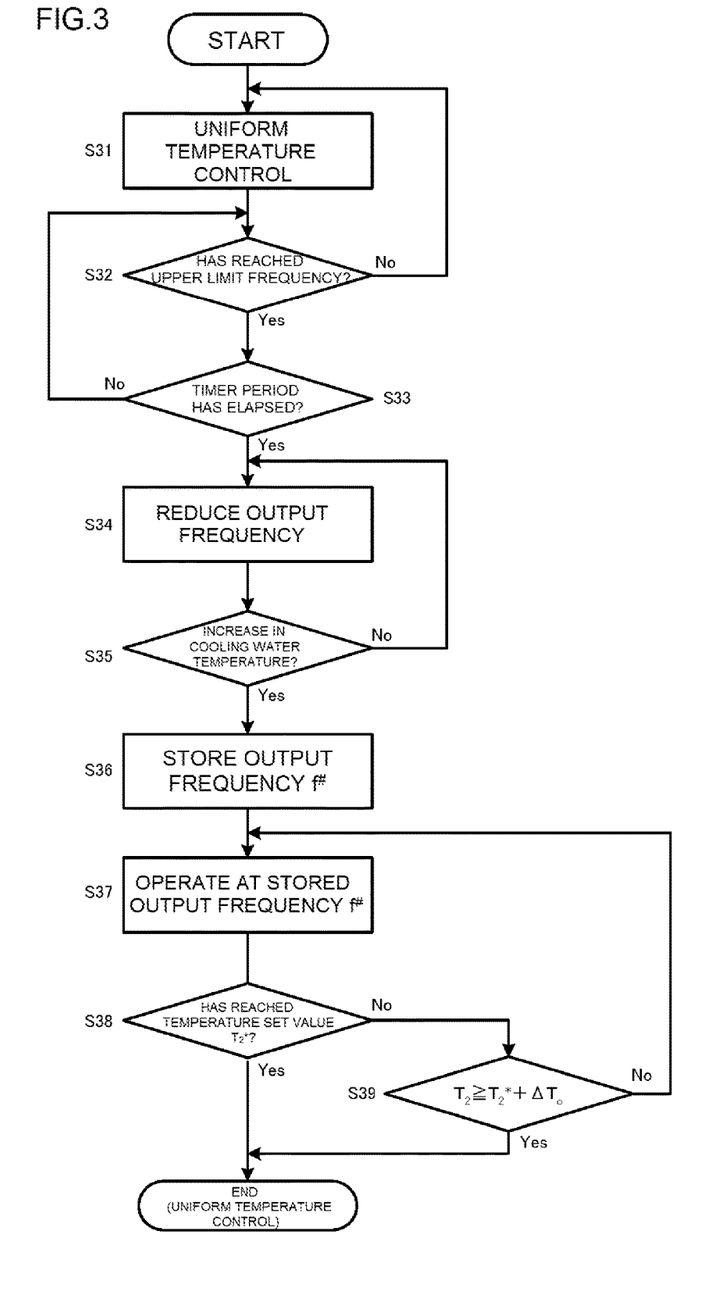
FIG. 3 is a flowchart illustrating a control operation according to the first embodiment of the invention.

Below, a control operation of the cooling system of this invention will be described with reference to the flowchart in FIG. 3.

The inverter apparatus 12 starts operation on the basis of an operation command issued by, for example, an upper-level controller (not illustrated), and implements uniform inlet temperature control of the cooling water in step S31. This uniform temperature control involves determining the deviation $\Delta T_2$ between the inlet temperature set value $T_2^*$ of the cooling water which is preset by the setting device 121 and the inlet temperature detection value $T_2$ from which noise has been removed by the filter 122, outputting the value calculated by the adjustment unit 126 for adjusting the differential $\Delta T_2$ to zero, as the frequency command value f*, and generating an AC voltage based on the frequency command value f*, in the inverter unit 127.

In step S32, it is determined whether or not the frequency command value f* has reached the upper limit frequency, and if the frequency command value f* has reached the upper limit frequency (step S32, Yes), the procedure advances to step S33. In step S33, it is determined whether or not a preset timer period has elapsed, and if the timer period has elapsed (step S33, Yes), then the procedure advances to set S34. The timer period can be varied by a setting from a parameter setting unit (not illustrated) which sets and changes parameters of various types for the inverter apparatus 12. In this way, in the wet-bulb temperature estimation control unit 131, an operation of wet-bulb temperature estimation control is started when the frequency command value f* has reached the upper limit frequency and a prescribed time period (the preset timer period) has elapsed in this state. Here, the fact that the frequency command value f* has reached the upper limit frequency means a state where further cooling of the cooling water is necessary in uniform temperature control.

When the operation of the wet-bulb temperature estimation control is started, the frequency command value f* is reduced gradually in step S34 at the prescribed frequency reduction rate which has been established previously, and in step S35 it is determined whether or not the inlet temperature detection value $T_2$ of the cooling water is increasing, and when the inlet temperature detection value $T_2$ of the cooling water increases (step S35, No), then the procedure returns to step S34. Here, the lower limit value when reducing the output frequency is set to a preset lower limit frequency (or lowest frequency, PID output lower limit in the adjustment unit 126). When the inlet temperature detection value $T_2$ of the cooling water in step S35 increases (step S35, Yes), the procedure advances to step S36. In step S36, it is considered that the output frequency $f^\#$ at which the inlet temperature detection value $T_2$ of the cooling water does not rise even if the frequency command value f* is reduced (the frequency one step before the output frequency at which the inlet temperature detection value $T_2$ rose in step S35) is the frequency corresponding to the wet-bulb temperature, and the output frequency $f^\#$ in this case is stored. Thereafter, the inverter apparatus 12 is operated using the stored output frequency $f^\#$ as a new frequency command value f* (step S37).

Thereafter, the inlet temperature of the cooling water is monitored on the basis of a signal from the cooling water inlet temperature sensor 7 in step S38, and if the inlet temperature detection value $T_2$ has not reached the inlet temperature set value $T_2^*$ (step S38, No), the procedure advances to step S39, and if the inlet temperature detection value $T_2$ has reached the inlet temperature set value $T_2^*$ (step S38, Yes), the wet-bulb temperature estimation control is terminated, and normal uniform inlet temperature control of the cooling water is implemented on the basis of the inlet temperature set value $T_2^*$.

On the other hand, in step S39, it is determined whether or not the inlet temperature detection value $T_2$ has increased by the preset temperature rise $\Delta T_0$ with respect to the inlet temperature set value $T_2^*$ (whether or not $T_2 \geq T_2^* + \Delta T_0$), and if the temperature increase is less than the temperature rise $\Delta T_0$ (step S39, No), then the procedure returns to step S37 and the wet-bulb temperature estimation control is continued, whereas if the temperature increase is equal to or greater than the temperature rise $\Delta T_0$ (step S39, Yes), then the wet-bulb temperature estimation control is terminated and normal uniform inlet temperature control of the cooling water is carried out on the basis of the inlet temperature set value $T_2^*$. This is provided for cases where, for an external reason of some kind, the inlet temperature of the cooling water does not fall and the inlet temperature detection value $T_2$ increases; when the inlet temperature detection value $T_2$ has increased by the temperature rise $\Delta T_0$ or more with respect to the inlet temperature set value $T_2^*$, it is determined that there has been an environmental change of some kind, and the system reverts to normal uniform inlet temperature control of the cooling water. The temperature rise $\Delta T_0$ can be varied by a setting from a parameter setting unit (not illustrated) which sets and changes parameters of various types for the inverter apparatus 12.

In this way, by reducing the frequency command value f* gradually at a preset frequency reduction rate when the frequency command value f* has reached the upper limit frequency, and storing the output frequency $f^\#$, at which the inlet temperature detection value $T_2$ of the cooling water does not rise despite the reduction of the frequency command value f*, and by thereafter operating the inverter apparatus 12 on the basis of the stored output frequency $f^\#$, it is possible to achieve similar optimization control to that achieved using dry and wet-bulb temperature measurement sensors, by using only a cooling water inlet temperature sensor. Consequently, for example, even under outside air conditions whereby a cooling effect matching the number of revolutions of the cooling fan 11 cannot be obtained, such as a low outside air temperature or a high outside air humidity, or the like, it is possible to reduce the energy consumption of the inverter apparatus 12.

Figure 4:
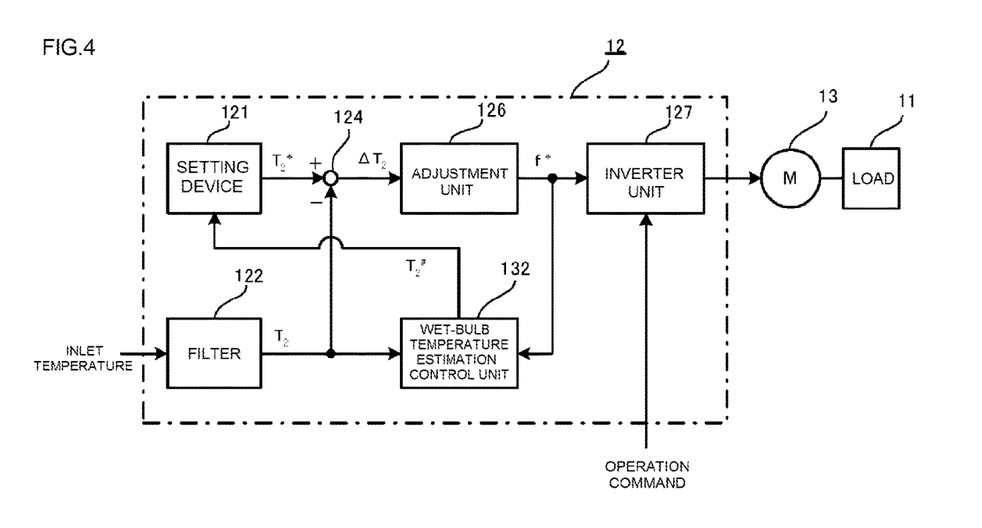
FIG. 4 is a schematic circuit diagram showing a second embodiment of the invention.

FIG. 4 is a schematic circuit diagram showing a second embodiment of the invention, and parts which have the same function as the first embodiment are labeled with the same reference numerals and description thereof is omitted here.

In FIG. 4, the point of difference with respect to FIG. 2 is that a wet-bulb temperature estimation control unit 132 is provided instead of the wet-bulb temperature estimation control unit 131. In other words, in the wet-bulb temperature estimation control unit 131, when the output frequency of the inverter apparatus 12 has reached the upper limit frequency, the output frequency is gradually reduced, the output frequency $f^\#$ at which the inlet temperature of the cooling water does not rise despite the reduction of the output frequency is stored, and the cooling fan 11 is controlled on the basis of this stored output frequency $f^\#$, whereas in the wet-bulb temperature estimation control unit 132, when the output frequency of the inverter apparatus 12 has reached the upper limit frequency, the output frequency is gradually reduced, and the temperature $T_2^\#$ at which the inlet temperature of the cooling water does not rise despite the reduction of the output frequency is stored, and the cooling fan 11 is controlled on the basis of this stored temperature $T_2^\#$. The wet-bulb temperature estimation control unit 132 operates when the frequency command value f* reaches an upper limit frequency, and discovers and stores a cooling water inlet temperature $T_2^\#$ ($\cong$wet-bulb temperature) at which, when the frequency command value f* has reached the upper limit frequency and the frequency command value f* is gradually reduced at a preset frequency reduction rate, the inlet temperature detection value $T_2$ of the cooling water does not rise despite the reduction of the frequency command value f*. Thereafter, the inverter apparatus 12 is operated by implementing uniform inlet temperature control, with this stored cooling water inlet temperature $T_2^\#$ being set as the new inlet temperature set value, but if the inlet temperature detection value $T_2$ reaches the inlet temperature set value $T_2^*$ which is the original target value, or if the inlet temperature detection value $T_2$ increases by a temperature rise of $\Delta T_0$, or more, with respect to the inlet temperature set value $T_2^*$, then the system reverts to normal uniform inlet temperature control based on the inlet temperature set value $T_2^*$.

A control operation of the cooling system according to this invention is described below with reference to the flowchart in FIG. 5, and since steps S51 to S55 are the same as steps S31 to S35 in FIG. 3, the operation is described here from step S56 onwards.

Figure 5:
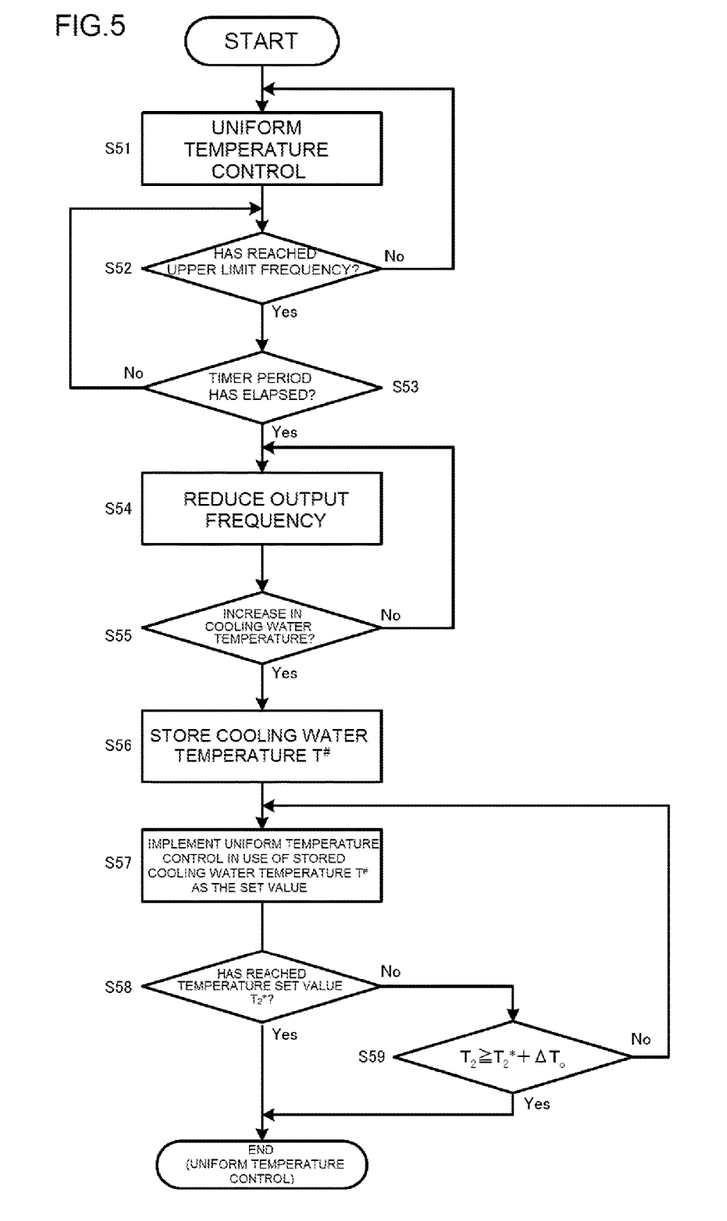
FIG. 5 is a flowchart illustrating a control operation according to the second embodiment of the invention.

In FIG. 5, when the inlet temperature detection value $T_2$ of the cooling water has increased in step S55, then in step S56, the cooling water temperature at which the inlet temperature detection value $T_2$ of the cooling water does not rise despite the reduction of the frequency command value f* is regarded as the cooling water inlet temperature $T_2^\#$ that corresponds to the wet-bulb temperature, and the cooling water inlet temperature $T_2^\#$ of the cooling water in this case is stored. Thereafter, the inverter apparatus 12 is operated by implementing uniform inlet temperature control by using this stored cooling water inlet temperature $T_2^\#$ as the new temperature set value (step S57). In other words, the stored cooling water inlet temperature $T_2^\#$ is set as a new setting value, the deviation $\Delta T_2$ with respect to the inlet temperature detection value $T_2$ from which noise has been removed by the filter 122 is determined, a value calculated by the adjustment unit 126 for adjusting the deviation $\Delta T_2$ to zero is output as the frequency command value f*, and an AC voltage based on the frequency command value f* is generated by the inverter unit 127.

Thereafter, the inlet temperature of the cooling water is monitored on the basis of a signal from the cooling water inlet temperature sensor 7 in step S58, and if the inlet temperature detection value $T_2$ has not reached the initially set inlet temperature set value $T_2^*$ (step S58, No), then the procedure advances to step S59, whereas if the inlet temperature detection value $T_2$ has reached the inlet temperature set value $T_2^*$ (step S58, Yes), then the wet-bulb temperature estimation control is terminated, and normal uniform inlet temperature control of the cooling water is implemented on the basis of the inlet temperature set value $T_2^*$ set by the setting device 121.

On the other hand, in step S59, it is determined whether or not the inlet temperature detection value $T_2$ has increased by the preset temperature rise $\Delta T_0$ with respect to the inlet temperature set value $T_2^*$ (whether or not $T_2 \geq T_2^* + \Delta T_0$), and if the temperature increase is less than the temperature rise $\Delta T_0$ (step S59, No), then the procedure returns to step S57 and the wet-bulb temperature estimation control is continued on the basis of the cooling water inlet temperature $T_2^\#$, whereas if the temperature increase is equal to or greater than the temperature rise $\Delta T_0$ (step S59, Yes), the it is determined that there has been an environmental change of some kind, the wet-bulb temperature estimation control is terminated and normal uniform inlet temperature control of the cooling water is carried out on the basis of the inlet temperature set value $T_2^*$.

In this way, by reducing the frequency command value f* gradually at a preset frequency reduction rate when the frequency command value f* has reached the upper limit frequency, and storing the cooling water inlet temperature $T_2^{\#}$, at which the inlet temperature detection value $T_2$ of the cooling water does not rise despite the reduction of the frequency command value f*, and by thereafter implementing uniform inlet temperature control on the basis of the stored cooling water inlet temperature $T_2^{\#}$, it is possible to achieve similar optimization control to that achieved using dry and wet-bulb temperature measurement sensors, by using only a cooling water inlet temperature sensor. Consequently, for example, even under outside air conditions whereby a cooling effect matching the number of revolutions of the cooling fan 11 cannot be obtained, such as a low outside air temperature or a high outside air humidity, or the like, it is possible to reduce the energy consumption of the inverter apparatus 12.

Figure 6:
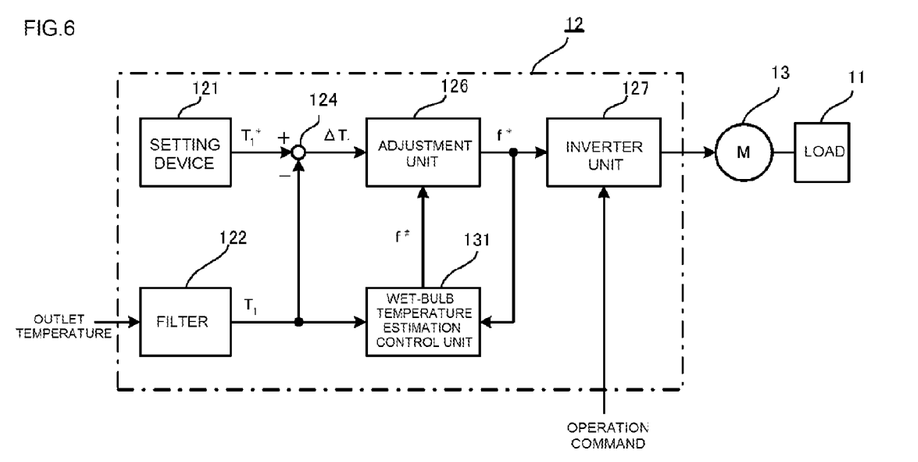
FIG. 6 is a schematic circuit diagram showing a third embodiment of the invention.

FIG. 6 is a schematic circuit diagram showing a third embodiment of the invention, and parts which have the same function as the first embodiment are labeled with the same reference numerals.

In FIG. 6, the point of difference with respect to the first embodiment in FIG. 2 is that uniform outlet temperature control is adopted instead of uniform inlet temperature control. The operation according to this embodiment is substantially the same as that in the first embodiment, apart from the feature in which the object of control is the outlet temperature $T_1$ rather than the inlet temperature $T_2$, hence the explanation thereof is omitted here.

Figure 7:
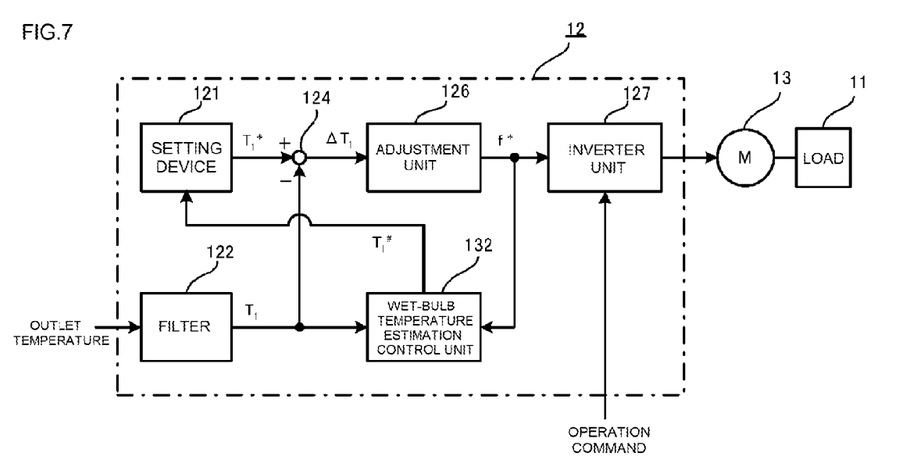
FIG. 7 is a schematic circuit diagram showing a fourth embodiment of the invention.

FIG. 7 is a schematic circuit diagram showing a fourth embodiment of the invention, and parts which have the same function as the second embodiment are labeled with the same reference numerals.

In FIG. 7, the point of difference with respect to the second embodiment in FIG. 4 is that uniform outlet temperature control is adopted instead of uniform inlet temperature control. The operation according to this embodiment is substantially the same as that in the second embodiment, apart from the feature in which the object of control is the outlet temperature $T_1$ rather than the inlet temperature $T_2$, hence the explanation thereof is omitted here.

Figure 8:
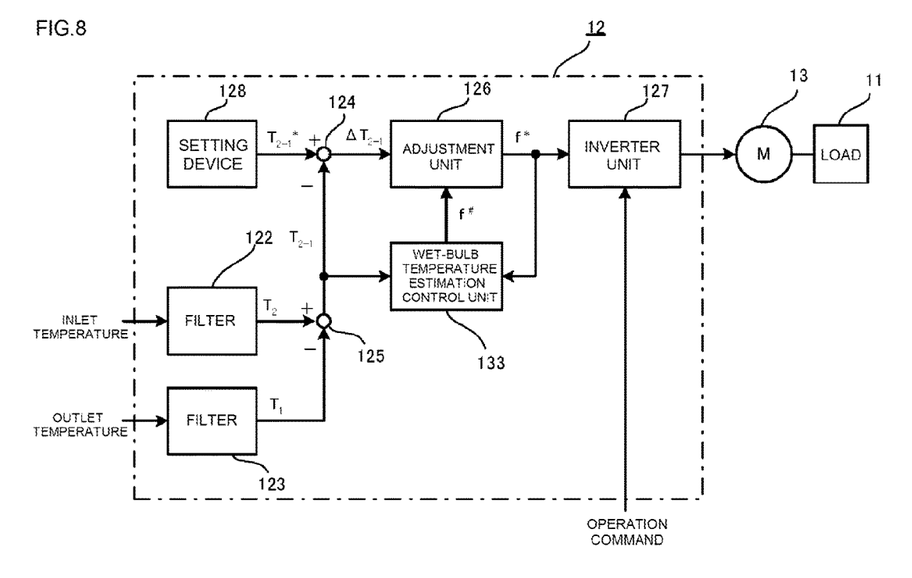
FIG. 8 is a schematic circuit diagram showing a fifth embodiment of the invention.

FIG. 8 is a schematic circuit diagram showing a fifth embodiment of the invention, and parts which have the same function as the first embodiment are labelled with the same reference numerals and description thereof is omitted here.

In the first embodiment, uniform cooling water inlet temperature is implemented, but the fifth embodiment differs from this in that uniform cooling water temperature differential control is implemented to control the temperature differential between the inlet temperature and the outlet temperature of the cooling water to a uniform differential.

Included in FIG. 8 is a setting device 128 which sets a set value $T_{2-1}^*$ for the temperature differential between the inlet temperature and the outlet temperature of the cooling water in the cooling tower 1, a filter 123 which removes a noise component that is superimposed on the outlet temperature detection value $T_1$ detected by the cooling water outlet temperature sensor 6 (see FIG. 1), an addition calculation unit 125 which determines a temperature differential $T_{2-1}$ ($=T_2-T_1$) between the inlet temperature detection value $T_2$ and the outlet temperature detection value $T_1$, and a wet-bulb temperature estimation control unit 133 which controls the output frequency of the inverter apparatus 12 on the basis of the temperature differential $T_{2-1}$ between the inlet and outlet of the cooling tower 1 and the frequency command value f*.

The wet-bulb temperature estimation control unit 133 operates when the frequency command value f* reaches an upper limit frequency, and discovers and stores an output frequency $f^{\#}$ ($\cong$frequency that corresponds to the wet-bulb temperature) at which, when the frequency command value f* has reached the upper limit frequency and the frequency command value f* is gradually reduced at a preset frequency reduction rate, the temperature differential $T_{2-1}$ of the cooling water does not increase despite the reduction of the frequency command value f*. Thereafter, the inverter apparatus 12 is operated by setting this stored output frequency $f^{\#}$ as a new frequency command value f*, but if the temperature differential $T_{2-1}$ of the cooling water reaches the temperature differential set value $T_{2-1}^*$ which is the original target value, or if the temperature differential $T_{2-1}$ increases by a temperature rise of $\Delta T_0$, or more, with respect to the temperature differential set value $T_{2-1}^*$, then the system reverts to normal uniform temperature differential control based on the temperature differential set value $T_{2-1}^*$.

Figure 9:
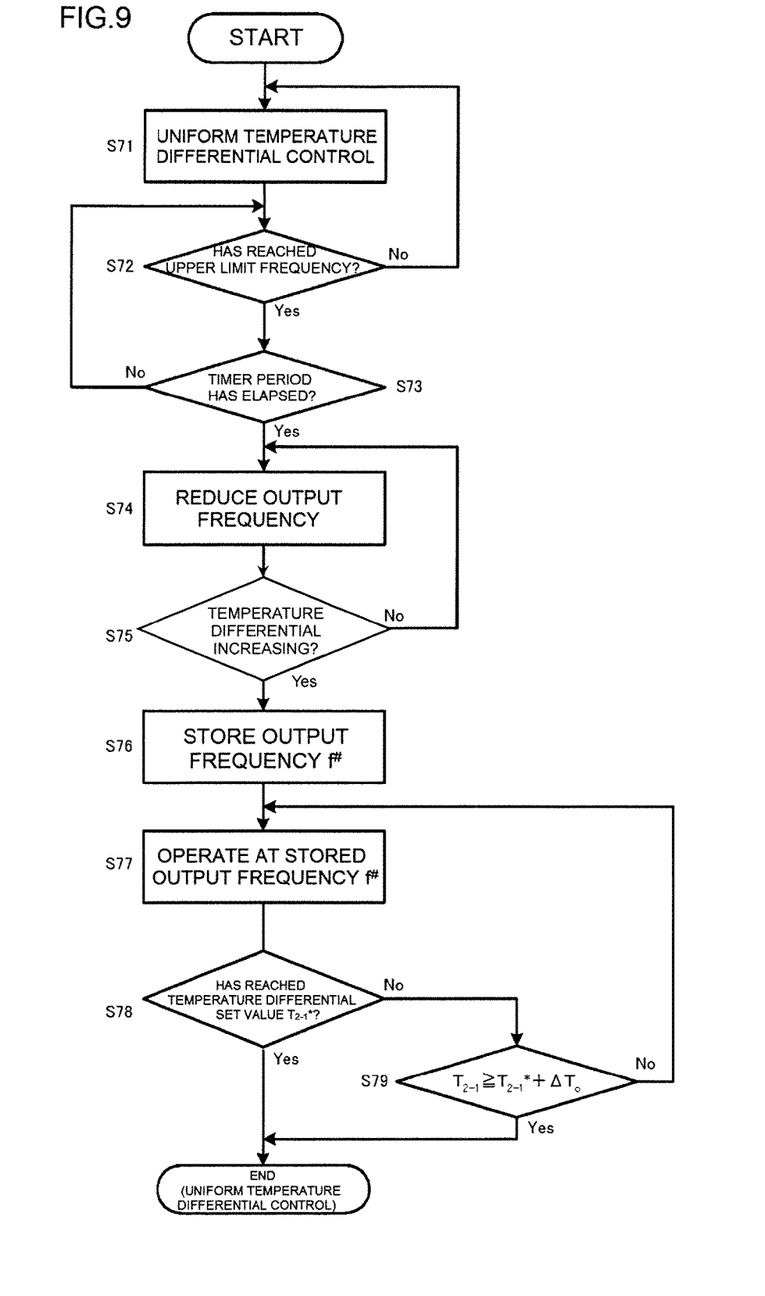
FIG. 9 is a flowchart illustrating a control operation according to the fifth embodiment of the invention.

Below, a control operation of the cooling system of this invention will be described with reference to the flowchart in FIG. 9.

The inverter apparatus 12 starts operation on the basis of an operation command issued by an upper-level controller (not illustrated), and implements uniform temperature differential control of the cooling water in step S71. This uniform temperature differential control involves determining the deviation $\Delta T_{2-1}$ between the temperature differential set value $T_{2-1}^*$ which is preset by the setting device 128 and the temperature differential $T_{2-1}$ obtained via the addition calculation unit 125, outputting as the frequency command value f* the value calculated by the adjustment unit 126 for adjusting the deviation $\Delta T_{2-1}$ to zero, and generating an AC voltage based on the frequency command value f*, in the inverter unit 127.

In step S72, it is determined whether or not the frequency command value f* has reached the upper limit frequency, and if the frequency command value f* has reached the upper limit frequency (step S72, Yes), the procedure advances to step S73. In step S73, it is determined whether or not a preset timer period has elapsed, and if the timer period has elapsed (step S73, Yes), then the procedure advances to set S74, and operation of the wet-bulb temperature estimation control is started.

When the operation of the wet-bulb temperature estimation control is started, the frequency command value f* is reduced gradually in step S74 at the prescribed frequency reduction rate which has been established previously, and in step S75 it is determined whether or not the temperature differential $T_{2-1}$ of the cooling water between the inlet and outlet is increasing, and when the temperature differential $T_{2-1}$ of the cooling water between the inlet and the outlet is not increasing (step S75, No), then the procedure returns to step S74. Here, the lower limit value when reducing the output frequency is set to a preset lower limit frequency (or lowest frequency, PID output lower limit in the adjustment unit 126). If the temperature differential $T_{2-1}$ is increasing in step S75 (step S75, Yes), then in step S76, the output frequency $f^{\#}$ at which the temperature differential $T_{2-1}$ of the cooling water does not increase despite the reduction of the frequency command value f* (the frequency one step before the output frequency at which the temperature differential $T_{2-1}$ increases in step S75) is considered to be a frequency corresponding to the wet-bulb temperature, and the output frequency $f^{\#}$ in this case is stored. Thereafter, the inverter apparatus 12 is operated using the stored output frequency $f^{\#}$ as a new frequency command value f* (step S77).

Thereupon, the temperature differential of the cooling water is monitored on the basis of signals from the cooling water inlet temperature sensor 7 and the cooling water outlet temperature sensor 6 in step S78, and if the temperature differential $T_{2-1}$ has not reached the temperature differential set value $T_{2-1}*$ (step S78, No), then the procedure advances to step S79, whereas if the temperature differential $T_{2-1}$ has reached the temperature differential set value $T_{2-1}*$, then the wet-bulb temperature estimation control is terminated and normal uniform temperature differential control based on the temperature differential set value $T_{2-1}*$ is implemented.

On the other hand, in step S79, it is determined whether or not the temperature differential $T_{2-1}$ has increased by the preset temperature rise $\Delta T_0$ with respect to the temperature differential set value $T_{2-1}*$ (whether or not $T_{2-1} \geq T_{2-1}* + \Delta T_0$), and if the increase in the temperature differential is less than the temperature rise $\Delta T_0$ (step S79, No), then the procedure returns to step S77 and the wet-bulb temperature estimation control is continued, whereas if the increase in the temperature differential is equal to or greater than the temperature rise $\Delta T_0$ (step S79, Yes), then it is determined that there has been an environmental change of some kind, the wet-bulb temperature estimation control is terminated and normal uniform temperature differential control based on the temperature differential set value $T_{2-1}*$ is implemented.

In this way, by reducing the frequency command value f* gradually at a preset frequency reduction rate when the frequency command value f* has reached the upper limit frequency, and storing the output frequency $f^\#$, at which the temperature differential $T_{2-1}$ of the cooling water does not rise despite the reduction of the frequency command value f*, and by thereafter operating the inverter apparatus 12 on the basis of the stored output frequency $f^\#$, it is possible to achieve similar optimization control to that achieved using dry and wet-bulb temperature measurement sensors, by using only a cooling water inlet temperature sensor and a cooling water outlet temperature sensor. Consequently, for example, even under outside air conditions whereby a cooling effect matching the number of revolutions of the cooling fan 11 cannot be obtained, such as a low outside air temperature or a high outside air humidity, or the like, it is possible to reduce the energy consumption of the inverter apparatus 12.

Figure 10:
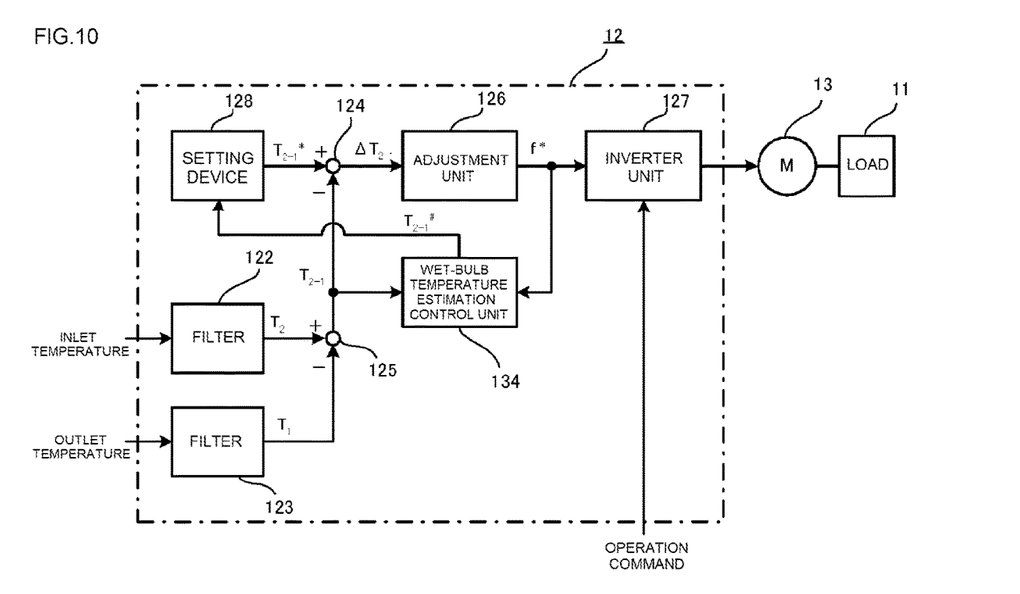
FIG. 10 is a schematic circuit diagram showing a sixth embodiment of the invention.

FIG. 10 is a schematic circuit diagram showing a sixth embodiment of the invention, and parts which have the same function as the fifth embodiment are labelled with the same reference numerals and description thereof is omitted here.

In FIG. 10, the point of difference with respect to FIG. 8 is that a wet-bulb temperature estimation control unit 134 is provided instead of the wet-bulb temperature estimation control unit 133. In other words, in the wet-bulb temperature estimation control unit 133, when the output frequency of the inverter apparatus 12 has reached the upper limit frequency, the output frequency is gradually reduced, the output frequency $f^\#$ at which the temperature differential $T_{2-1}$ of the cooling water does not rise despite the reduction of the output frequency is stored, and the cooling fan 11 is controlled on the basis of this stored output frequency $f^\#$, whereas in the wet-bulb temperature estimation control unit 134, when the output frequency of the inverter apparatus 12 has reached the upper limit frequency, the output frequency is gradually reduced, and the temperature differential $T_{2-1}^\#$ at which the temperature differential $T_{2-1}$ of the cooling water does not increase despite the reduction of the frequency command value f* is stored, and thereafter, the cooling fan 11 is controlled on the basis of this stored temperature differential $T_{2-1}^\#$. The wet-bulb temperature estimation control unit 134 operates when the frequency command value f* reaches an upper limit frequency, and discovers and stores a temperature differential $T_{2-1}^\#$ ($\cong$ temperature differential that corresponds to the wet-bulb temperature) at which, when the frequency command value f* has reached the upper limit frequency and the frequency command value f* is gradually reduced at a preset frequency reduction rate, the temperature differential $T_{2-1}$ of the cooling water does not increase despite the reduction of the frequency command value f*. Thereafter, the inverter apparatus 12 is operated by implementing uniform inlet temperature control using the stored temperature differential $T_{2-1}^\#$ as the new temperature differential set value $T_{2-1}*$, but if the temperature differential $T_{2-1}$ of the cooling water has reached the temperature differential set value $T_{2-1}*$ which is the original target value, or if the temperature differential $T_{2-1}$ of the cooling water has increased by the temperature rise $\Delta T_0$, or more, with respect to the temperature differential set value $T_{2-1}*$, then the system reverts to normal uniform temperature differential control.

Below, a control operation of the cooling system according to this embodiment of the invention is described below with reference to the flowchart in FIG. 11, and since steps S91 to S95 are the same as steps S71 to S75 in FIG. 9, the operation is described here from step S96 onwards.

Figure 11:
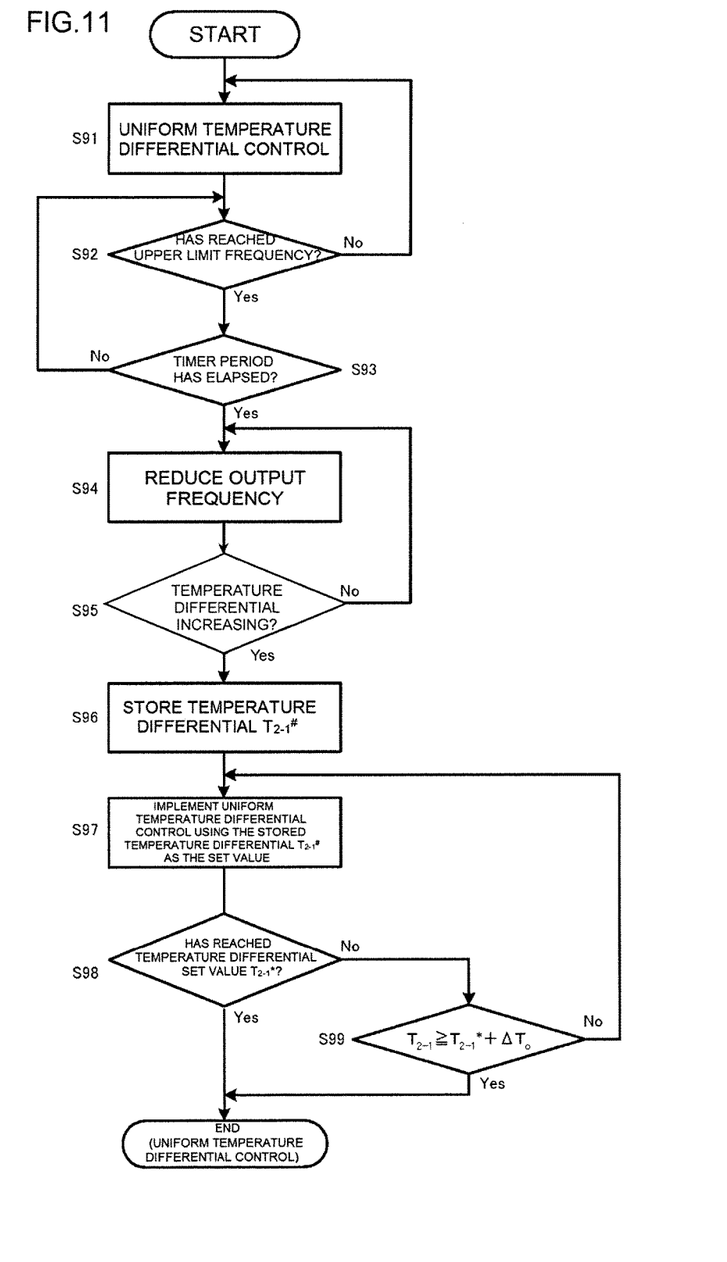
FIG. 11 is a flowchart illustrating a control operation according to the sixth embodiment of the invention.

In FIG. 11, when the temperature differential $T_{2-1}$ is increasing in step S95, then in step S96, the temperature differential of the cooling water at which the temperature differential $T_{2-1}$ does not increase despite the reduction in the frequency command value f* is considered to be the temperature differential $T_{2-1}^\#$ corresponding to the wet-bulb temperature, and the temperature differential $T_{2-1}^\#$ of the cooling water in this case is stored. Thereafter, the stored temperature differential $T_{2-1}^\#$ is set as a new set value, and the inverter apparatus 12 is operated by implementing uniform temperature differential control (step S97). In other words, the stored temperature differential $T_{2-1}^\#$ is set as a new temperature differential set value, the deviation $\Delta T_{2-1}$ with respect to the calculated temperature differential $T_{2-1}$ is determined, a value calculated by the adjustment unit 126 for adjusting the deviation $\Delta T_{2-1}$ to zero is output as the frequency command value f*, and an AC voltage based on the frequency command value f* is generated by the inverter unit 127.

Thereupon, the temperature differential of the cooling water is monitored on the basis of signals from the cooling water inlet temperature sensor 7 and the cooling water outlet temperature sensor 6 in step S98, and if the temperature differential $T_{2-1}$ has not reached the temperature differential set value $T_{2-1}*$ which is the original target value (step S98, No), then the procedure advances to step S99, whereas if the temperature differential $T_{2-1}$ has reached the temperature differential set value $T_{2-1}*$ (step S98, Yes), then the wet-bulb temperature estimation control is terminated and normal uniform temperature differential control based on the temperature differential set value $T_{2-1}*$ that was set by the setting device 128 is implemented.

On the other hand, in step S99, it is determined whether or not the temperature differential $T_{2-1}$ has increased by the previously established temperature differential set value $\Delta T_0$ with respect to the temperature differential set value $T_{2-1}*$ (whether or not $T_{2-1} \geq T_{2-1}* + \Delta T_0$), and if the increase in the temperature differential is less than the temperature rise $\Delta T_0$ (step S99, No), then the procedure returns to step S97 and the wet-bulb temperature estimation control based on the temperature differential $T_{2-1}*$ is continued, whereas if the increase in the temperature differential is equal to or greater than the temperature rise $\Delta T_0$ (step S99, Yes), then it is determined that there has been an environmental change of some kind, the wet-bulb temperature estimation control is terminated and normal uniform temperature differential control based on the temperature differential set value $T_{2-1}^*$ is implemented.

In this way, by reducing the frequency command value f* gradually by a preset frequency reduction rate when the frequency command value f* has reached the upper limit frequency, and storing the temperature differential $T_{2-1}^{\#}$, at which the temperature differential $T_{2-1}$ of the cooling water does not increase despite the reduction of the frequency command value f*, and by thereafter implementing uniform temperature differential control based on the stored temperature differential $T_{2-1}^{\#}$, it is possible to achieve similar optimization control to that achieved using dry and wet-bulb temperature measurement sensors, by using only a cooling water inlet temperature sensor and a cooling water outlet temperature sensor. Consequently, for example, even under outside air conditions whereby a cooling effect matching the number of revolutions of the cooling fan 11 cannot be obtained, such as a low outside air temperature or a high outside air humidity, or the like, it is possible to reduce the energy consumption of the inverter apparatus 12.

The first through sixth embodiments given above were described with reference to "control of the cooling fan 11" involving control of the cooling fan 11 by the inverter apparatus 12, but further embodiments of the invention can also be implemented through "control of the cooling water pump 21" involving control of the cooling water pump 21 by an inverter apparatus 22, and "control of both the cooling fan 11 and the cooling water pump 21" involving control of the cooling fan 11 by the inverter apparatus 12 and control of the cooling water pump 21 by an inverter apparatus 22.

Furthermore, in the first through sixth embodiments described above, in order to respond to cases where there is a change in the outside air conditions, the settings made with the wet-bulb temperature estimation control unit may be reset and control may be restarted, when a predetermined time period has elapsed or when an external signal is input. Here, the external signal is a signal that is input when a change of a prescribed magnitude occurs, on the basis of monitoring the outside air conditions and/or load conditions at prescribed intervals, for instance. Moreover, it may also be possible to select whether or not the reset operation is carried out.

REFERENCE SIGNS AND NUMERALS ARE AS FOLLOWS 1 cooling tower
2 refrigeration device
3 air conditioner
4 cooling water pipe
5 cold water pipe
6 cooling water outlet temperature sensor
7 cooling water inlet temperature sensor
8 cold water inlet temperature sensor
9 cold water outlet temperature sensor
11 cooling fan
12, 22, 32 inverter apparatus
21 cooling water pump
31 cold water pump
121 setting device
122, 123 filter
124, 125 addition calculation unit
126 adjustment unit
127 inverter unit
131, 132, 133, 134 wet-bulb temperature estimation control unit In this disclosure, since only a few embodiments have been shown and described, the usage of the term "step" or "steps" does not limit the operations to a particular recited sequence of the step or steps. The necessity of a particular sequence for discussed steps is instead determined based on the principles and spirit of the invention, the scope of which is defined in the claims and their equivalents. Furthermore, any use of the term "or" in the claims denotes an "inclusive or" as opposed to a "mutually exclusive or."

Although an embodiment has been shown and described, it would be appreciated by those skilled in the art that changes may be made in the embodiment without departing from the principles and spirit of the invention, the scope of which is defined in the claims and their equivalents.

What is claimed is:

1. A control apparatus for a cooling system having a cooling tower, a refrigeration device, a cooling fan provided in the cooling tower, and a cooling water pump configured to circulate cooling water between the cooling tower and the refrigeration device, the control apparatus comprising:
    an inlet temperature sensor configured to detect a first temperature of the cooling water at an inlet of the cooling tower;
    an outlet temperature sensor configured to detect a second temperature of the cooling water at an outlet of the cooling tower;
    a calculator configured to calculate a temperature differential between the first temperature and the second temperature;
    an inverter apparatus, comprising an inverter and a wet-bulb temperature estimation controller, configured to
        calculate a command value usable to control the temperature of the cooling water such that the temperature differential matches a preset value, and
        variably control a speed of a cooling device, which is the cooling fan or the cooling water pump, by generating an AC voltage at an output frequency based on the command value,
        in response to the output frequency having reached an upper limit frequency, repeatedly decrease, by the wet-bulb temperature estimation controller, the output frequency of the inverter apparatus by a preset frequency reduction amount until the decrease of the output frequency of the inverter apparatus by the preset frequency reduction rate results in an increase in the temperature differential,
        store a condition, the condition being:
            a value of the output frequency one step before a value of the output frequency which resulted in the increase in the temperature differential, or
            a value of the temperature differential one step before the inverter apparatus being operated at the value of the output frequency which resulted in the increase in the temperature differential, and
        control the cooling device on the basis of the stored condition.

2. The control apparatus according to claim 1, wherein the cooling device is the cooling fan, and
    the condition is the value of the output frequency one step before the value of the output frequency which resulted in the increase in the temperature differential.

3. The control apparatus according to claim 1, wherein the cooling device is the cooling fan, and
    the condition is the value of the temperature differential one step before the inverter apparatus being operated at the value of the output frequency which resulted in the increase in the temperature differential.

4. The control apparatus according to claim 1, wherein
the cooling device is the water pump, and
the condition is the value of the output frequency one step before the value of the output frequency which resulted in the increase in the temperature differential.

5. The control apparatus according to claim 1, wherein
the cooling device is the water pump, and
the condition is the value of the temperature differential one step before the inverter apparatus being operated at the value of the output frequency which resulted in the increase in the temperature differential.

6. The control apparatus according to claim 1, wherein in response to both the output frequency having reached the upper limit frequency and the output frequency remaining at the upper limit frequency for a preset time period, the wet-bulb temperature estimation controller is to repeatedly decrease the output frequency of the inverter apparatus by the preset frequency reduction amount until the decrease of the output frequency of the inverter apparatus by the preset frequency reduction amount results in the increase in the temperature differential.

7. The control apparatus according to claim 1, wherein the inlet temperature sensor and the outlet temperature sensor are provided in a cooling water pipe connecting the cooling tower to the refrigeration device.

* * * * *